UNITED STATES PATENT OFFICE.

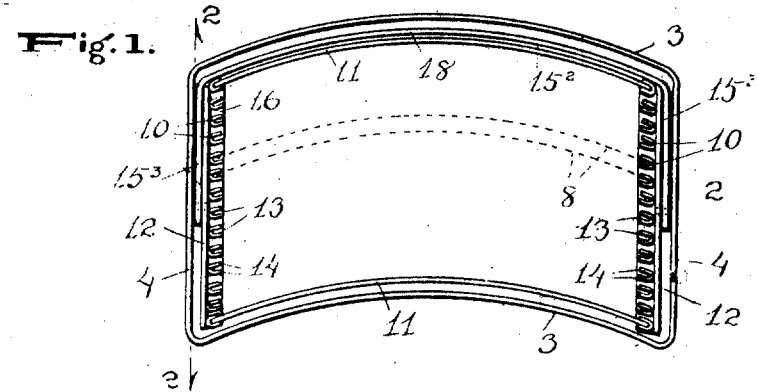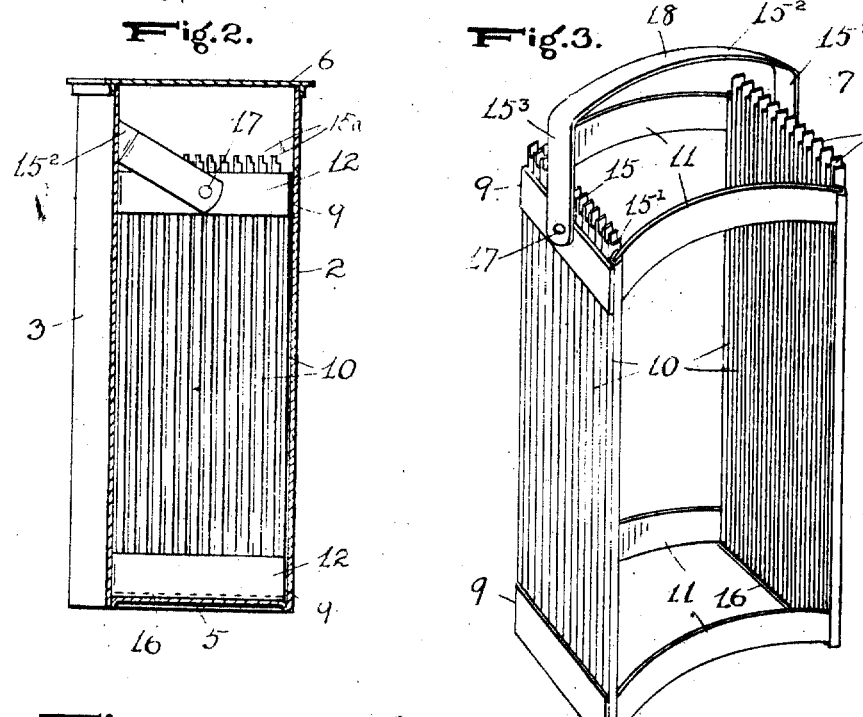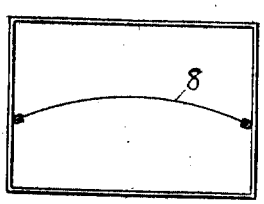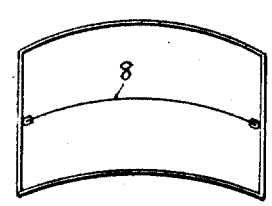

BENJAMIN M. DICKSON, OF VIROQUA, WISCONSIN.

PHOTOGRAPHIC DEVELOPING-TANK AND RACK.

1,234,641.  
Specification of Letters Patent.  
Patented July 24, 1917.

Application filed October 7, 1916. Serial No. 124,342.

*To all whom it may concern:*

Be it known that I, BENJAMIN M. DICKSON, a citizen of the United States, resident of Viroqua, in the county of Vernon and State of Wisconsin, have made a certain new and useful Invention in Photographic Developing-Tanks and Racks; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a top plan view of the invention with cover removed.

Fig. 2 is a section on line 2—2, Fig. 1.

Fig. 3 is a detail perspective view of the rack.

Fig. 4 is a diagrammatic view showing a tank in plan with flat sides opposite the films and a film inserted in position.

Fig. 5 is a similar view showing the tank with one side opposite the films of greater radius than the normal radius of the curved films and the other opposite side of lesser radius than said normal radius.

The invention has relation to a combined rack and tank for use in the development of photographic films, usually portrait films, now fast taking the place of glass dry plates, the object being to provide a device wherein these films may be held in the development thereof, so that in the expansion of the films, which follows in the process of treatment, the films will not come in contact with each other and injure the negatives carried thereby.

The invention consists in the novel construction and combination of parts as hereinafter set forth.

In the accompanying drawings illustrating the invention, the numeral 2 designates the casing or tank, having parallel arcuate or cylindrically curved sides 3, connected by plane sides 4; a plane bottom 5, and a removable plane top or cover 6.

Located within the tank is a removable skeleton form rack 7 carrying the films 8, and including as a part thereof end frames 9 and longitudinal rods or bars 10 connecting the two end frames and spaced apart from each other to admit the developing solution therebetween. Usually the end frames will be provided with parallel arcuate or cylindrically curved sides 11, connected by plane sides 12.

The longitudinal rods are provided each with an inner longitudinal groove 13, all of the grooves being oblique or inclined and each groove having side walls 14 parallel to each other and to the walls of the other grooves. It is preferred to form said rods or bars of sheet or flat metal bent into U-form, and soldered or otherwise secured at the bends or backs thereof to the straight sides of the end frames, an additional or corner rod being provided at each end of the series of rods at each side of the rack, the corner rods having the grooves thereof engaged by the arcuate sides 11 of the end frames, whereby the framework of the rack is composed of four obliquely grooved corner rods, and two end frames, each end frame having two flat or straight sides soldered to the corner rods, and two arcuate or cylindrically curved sides fitting and secured in the grooves of the corner rods.

One side wall 15 of each of the rods 10, usually projects beyond the other side wall 15′ thereof at the top of the rack at 15ᵃ to serve as a guide in the insertion of the films, and the grooves of said bars at the bottom of the rack are usually closed by a right angle flange 16 of the plane sides of the bottom end frame, to limit the inward movement of the films.

A bail form handle 15 may be provided for the rack, said handle having pivots 17 engaging perforations of the plane sides of the top end frame, the straight sides 15′ and the arcuate or cylindrically curved top 18 of this handle being in the folded position of the handle close to the straight sides and convex curved side of the top end frame, to enable the handle to be closed down within the tank.

The rack is made of less breadth than that of the films, whereby in connection with the obliquely grooved rods, the films will be caused to assume a curved or cylindrically arched form parallel to each other and equally spaced apart at all points, and parallel also and equally spaced apart from the arcuate or cylindrically curved side walls of the tank. In expanding the films will assume a cylindrically arched form of lesser radius than normal and will retain their parallel position equally spaced apart from each other.

A smaller tank is enabled to be employed in the present case, and less of the developing solution, as the films can be placed closer together without danger of contact in the expansion thereof.

In cases where the films are arranged flatwise in holders, in expanding the films will be liable to move toward and in contact with each other from their normal planes, with consequent injury, as stated, whereas by the use of this invention the films in expanding will be caused to move in the same direction and will retain their parallel relation.

In some cases it may be desirable to have the space between the end frames of the rack greater than the length of the individual films, so that the films in expanding will not contact with said end frames. And for the same reason the convex side of the tank toward which the films expand may be of lesser radius than the normal radius of the curved films in the tank, the concave side of the tank being made flat, or of greater radius than the normal radius of the curved films.

I claim:—

1. A device for the purpose described, consisting of a tank, and a removable rack within said tank, said rack having at each side a plurality of rods, said rods provided with parallel transversely inclined grooves, the rods at one side of the tank having the grooves thereof inclined in an opposite direction to the grooves of the rods at the other side of the tank.

2. A device for the purpose described, consisting of a tank having parallel concavo-convex front and back sides, and a removable rack within said tank, said rack having at each side a plurality of rods, said rods provided with parallel transversely inclined grooves, the rods at one side of the tank having the grooves thereof inclined in an opposite direction to the grooves of the rods at the other side of the tank.

In testimony whereof I affix my signature in presence of two witnesses.

BEN. M. DICKSON.

Witnesses:
H. E. PACKARD,
A. T. FORTUN.